Oct. 5, 1971 E. J. SHAW ET AL 3,609,858

METHOD OF MAKING A PLANAR, SEGMENTED MEMORY UNIT

Filed Dec. 18, 1969 2 Sheets-Sheet 1

INVENTORS
E. J. SHAW
D. G. STETKA
By J. D. Kaufmann
ATTORNEY

United States Patent Office 3,609,858
Patented Oct. 5, 1971

3,609,858
METHOD OF MAKING A PLANAR, SEGMENTED MEMORY UNIT

Everett Jesse Shaw, Pennington, N.J., and Daniel George Stetka, Fallston, Md., assignors to Western Electric Company, Incorporated, New York, N.Y.

Filed Dec. 18, 1969, Ser. No. 886,189
Int. Cl. H01f 7/06
U.S. Cl. 29—604 19 Claims

ABSTRACT OF THE DISCLOSURE

Briefly, the present disclosure contemplates a novel method of fabricating an article, such as a memory card, which comprises mounting a spaced matrix of workpieces, for example, magnetic elements, to a substrate, which may be a non-magnetic sheet. The substrate has given X and Y dimensions and each workpiece is spaced from adjacent workpieces by selected X and Y spacings.

A sheet of material, from which the workpieces are made, is slit to form a plurality of first strips. The first strips, separated by the desired X spacing, are adhered to a carrier. This separation is effected either by transversely separating the first strips or by adhering alternate first strips (e.g., every other strip, every third strip, etc.) to the carrier. The carrier is then slit transversely to the spaced first strips to form a plurality of second strips. This latter slitting step may be effected so that each of the second strips has a transverse dimension equal to the desired Y spacing. Lastly, the second strips are alternately adhered to the substrate. For example, every other second strip may be adhered to one substrate and then the remaining strips are adhered to another substrate. Alternatively, the second strips may be separated transversely to effect the desired Y spacing and adhered, as so spaced, to the substrate.

BACKGROUND OF THE INVENTION

(1) Field of the invention

The present invention relates to, and has as one object, a method of fabricating an article which comprises a matrix of spaced workpieces mounted to a substrate. More particularly, this invention relates to, and has as a further object, a method of fabricating an article, such as a memory card, which includes a matrix of spaced workpieces, such as magnetic elements, mounted to a non-magnetic substrate. Such a memory card may find use in a computer memory or in the memory portion of an electronic telephone switching exchange.

(2) Discussion of the prior art

In many environments some sort of electrical or magnetic memory is required. There are many types of such memories, including ferrite cores, twistors, and other magnetic domain devices and bistable electrical circuits. Another type of memory especially useful in electronic telephone switching systems is a so-called memory card.

A memory card comprises a non-magnetic substrate which may be electrically conductive. Often the substrate is made of aluminum. Mounted to the substrate is a matrix of similar, spaced magnetic elements or segments. Typically, these elements comprise small squares or rectangles of a magnetic material such as Vicalloy or nickel-cobalt. Information is both stored and read out from such a memory card by associating the elements with electrical conductors and by selectively passing current through the conductors to selectively magnetize and demagnetize the elements. Where the substrate is aluminum, it serves as a ground plane.

There are a number of physical characteristics such memory cards must possess, and these characteristics must be viewed with respect to a number of limitations inherent in prior art processes for making the memory cards.

Usually, the magnetic elements, measuring .040 by .040 inch, are approximately .001 inch thick and must be firmly and accurately mounted to the substrate in the matrix. The matrix may be rather large, often comprising a rectangular array which is 55 or more elements by 64 or more elements, the spacing between the elements being from .060 to .120 inch.

There are at least three prior art processes which have been used to fabricate such a memory card. All three processes are somewhat undesirable for a variety of reasons. Each process is discussed separately below.

The most often used prior art process is a subtractive etching process. In subtractive etching, a sheet or foil of a magnetic material such as Vicalloy or nickel-cobalt is laminated to an aluminum substrate by any one of a variety of well-known techniques. The sheet is then masked, for example with an appropriately exposed photoresist or a screened-on etch resist, and then is subjected to the action of a strong etchant. The strong etchants used with this process are typically ammonium persulfate or chromic acid. Both of these etchants are extremely corrosive; moreover, water rinses used during subtractive etching will, after a period of time, contain substantial amounts of these etchants. As a consequence, neither the etchants nor the rinses may be disposed of via the usual waste disposal facilities, an obvious pollution problem otherwise existing. Thus, both the etchants and the rinses must be disposed of by special scavenger systems or by other special treatment either of which is both costly and time-consuming.

In addition, due to the smallness of each magnetic element, 90% or more of the magnetic sheet is dissolved by subtractive etching. This dissolution leads to either the disposing of the valuable metal constituents of the magnetic sheet or to the costly and time-consuming recovery of such constituents from the etchants.

The subtractive etching process inherently embodies other time-consuming and costly procedures. For example, if photoresists are used to mask the sheet, such resists must be coated thereon in a uniform layer, properly exposed to light, baked, developed, and ultimately removed. Also, regardless of the type of mask used, there are always the problems of adequate mask definition and of non-uniform undercutting of the magnetic elements during etching. Undercutting may, if severe enough, render the magnetic elements so dissimilar that the memory card is unusable.

A second prior art process involves the selective electrolytic or electroless deposition of the magnetic elements onto the aluminum substrate. If an active anode is used in an electrolytic procedure, it has been found that because of variations in the electrical field during plating, thickness variations in the magnetic elements result. Such thickness variations may lead to the memory cards being rendered unusable. If either an electrolytic process with an inert anode or an electroless process is used, it is, of course, necessary to add to the plating solution (or electrolyte) metal salts which are to be the metal constituents of the magnetic elements. Unless expensive recovery procedures are effected, a portion of these metal salts are ultimately wasted. Moreover, the plating solutions, may, similar to the etchants used in subtractive etching, constitute a pollution hazard and, accordingly, may require special scavenging procedures.

Additionally, both electrolytic and electroless plating require masking the substrate similar to the undesirable masking step required for subtractive etching.

The third prior art process involves the use of punches and dies to punch out the magnetic elements from a sheet or foil of the magnetic material, and the attaching of these elements to the substrate. There are some rather apparent difficulties with this process, especially those involving the handling and alignment of the punched-out elements which, as noted previously, are quite small.

Moreover, additional less apparent difficulties attend this technique. Specifically, it has been found that the magnetic characteristics of the magnetic elements of a memory card produced by a punch and die technique are nonuniform and often render the memory card completely unusable. These magnetic non-uniformities have been traced to the "working" effects of the punch and die on the sheet or foil. A solution to this problem has been frequent inspection, and, when necessary, the frequent replacement or adjustment of worn punches and dies which is hardly desirable from a mass production standpoint. Wearing of the punches and dies may also lead to undesirable size variation in the magnetic elements.

SUMMARY OF THE INVENTION

Accordingly, another object of this invention is to provide a novel method of fabricating an article which method avoids the problems of the prior art, as discussed above.

Briefly, the present invention contemplates a novel method of fabricating an article, such as a memory card, which comprises mounting a spaced matrix of workpieces, for example, magnetic elements to a substrate, which may be a non-magnetic sheet. The substrate has given X and Y dimensions and each workpiece is spaced from adjacent workpieces by selected X and Y spacings.

A sheet of material, from which the workpieces are made, is slit to form a plurality of first strips. The first strips, separated by the desired X spacing, are adhered to a carrier. This separation is effected either by transversely separating the first strip, or by adhering alternate first strips (e.g., every other strip, every third strip, etc.) to the carrier. The carrier is then slit transversely to the spaced first strips to form a plurality of second strips. This latter slitting step may be effected so that each of the second strips has a transverse dimension equal to the desired Y spacing. Lastly, the second strips are alternately adhered to the substrate. For example, every other second strip may be adhered to one substrate and then the remaining strips are adhered to another substrate. Alternatively, the second strips may be separated transversely to effect the desired Y spacing and adhered, as so spaced, to the substrate.

BRIEF DESCRIPTION OF THE DRAWINGS

Other objects and advantages of the present invention will appear upon consideration of the following detailed description in conjunction with the accompanying drawings, wherein.

DETAILED DESCRIPTION

Figure 1:
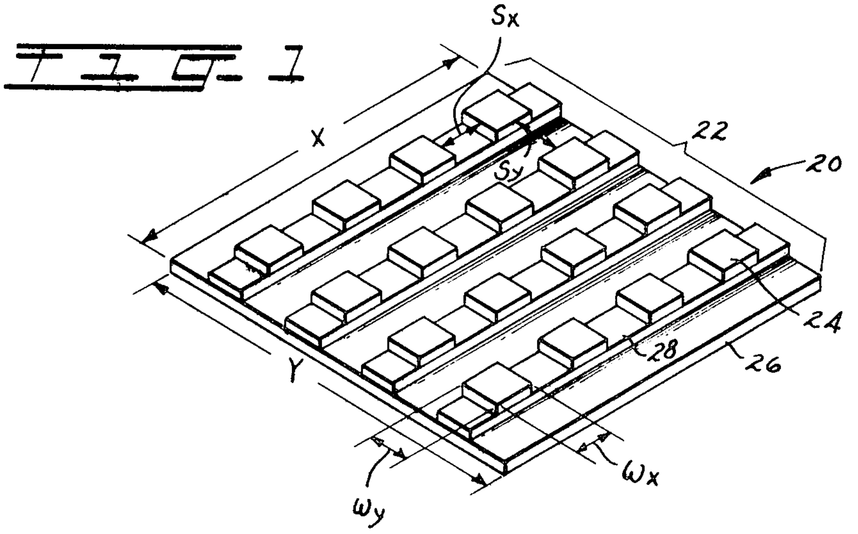
FIG. 1 is a plan view of an article which includes a matrix of spaced workpieces mounted to a substrate in accordance with the principles of this invention.

Referring to FIG. 1 there is shown an article 20, such as a memory card, which includes a spaced matrix 22 of workpieces 24, which may be magnetic elements made of a material such as Vicalloy or cobalt-nickel. The elements 24 are mounted to a substrate 26, one example of which is a piece of aluminum or other electrically conductive, non-magnetic metal. Of course, other substrate materials may be used which need not be conductive or non-magnetic. The substrate 26 has a predetermined width, hereinafter referred to as the Y dimension, and a predetermined length, hereafter referred to as the X dimension. The elements 24 are adhered to the substrate 26 by appropriate separated layers 28 of an adhesive or of cured plastic.

In many of the memory cards 20 of the prior art, a single area film (not shown) of an adhesive covers the substrate 26 to attach the elements 24 to the substrate 26. Not only are the layers 28 just as expedient as the area film, but a saving of material is also realized by the use of such layers 28. In the usual memory card 20 each element 24 is a square .040 inch by .040 inch and .001 inch thick. The matrix 22 may typically contain fifty-five elements 24 in the Y direction and sixty-four elements 24 in the X direction. The typical spacing between adjacent elements 24 in the X direction and ($S_x$) is .120 inch and in the Y direction ($S_y$) is .060 inch. For purposes of this invention, other sizes and spacings of elements may, of course, be used. In fact, for the purpose of discussing this invention, FIG. 1 shows a memory card 20 having a 4 x 5 matrix 22 of elements 24 on a substrate 26. Each element is a square .040 inch by .040 inch, the spacing between adjacent elements being .120 inch in the X direction (i.e., $S_x$=.120 inch) and .060 inch in the Y direction (i.e., $S_y$=.060 inch).

Figure 2:
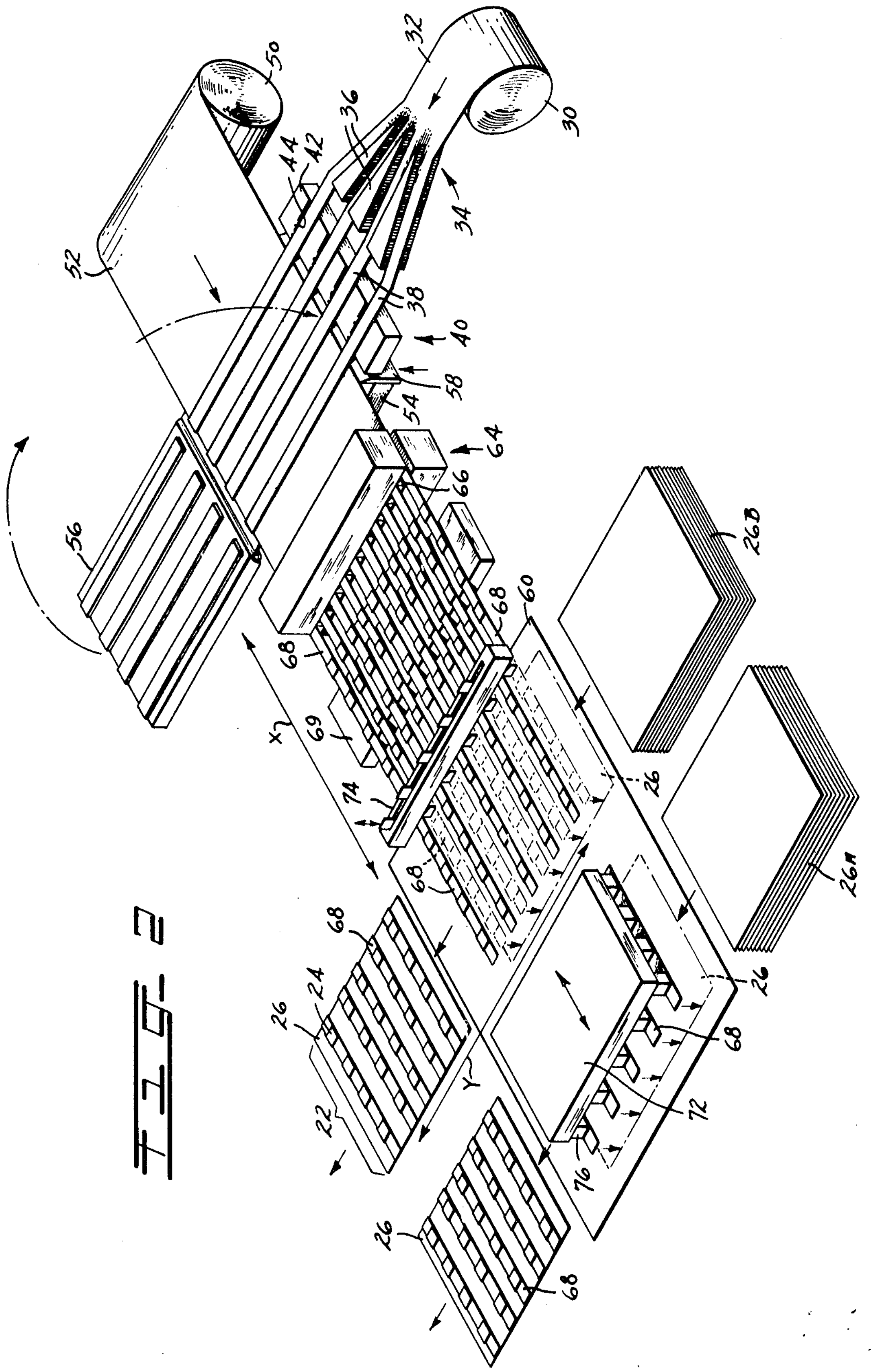
FIG. 2 is a stylized representation of apparatus including slitting facilities, which may be utilized by the method of the present invention to fabricate the article of FIG. 1.

The present novel method of producing the memory card 20 is now described with respect to the stylized apparatus depicted in FIG. 2. It is understood that other types of apparatus, as well as manual operations, could be used in place of the apparatus of FIG. 2.

A rotatable supply drum 30 containing a supply of magnetic metal tape 32, for example, of Vicalloy or of cobalt-nickel, is fed by any appropriate means (not shown) past a slitting station 34. The slitting station 34 may contain a plurality of stationary slitting knives 36. Moreover, rotatable slitting knives 37 which effect no material removal (FIG. 3) or slitting saws 37A which slit and effect material removal (FIG. 4) may be used in place of the slitting knives 36.

The number of slitting knives or saws 36, 37, 37A is chosen so that the tape 32 is slit into a desired number ($P_x$) of first strips 38. The desired number of strips 38 is either the number ($E_x$) of elements 24 in the X direction on the memory card 20 or is some whole number multiple thereof, the choice depending upon which of two alternative described below, is used to space the first strips 38.

In a first embodiment, FIG. 2, the number, $P_x$, of first strips 38 produced at the slitting station 34 is equal to the number, $E_x$, of elements 24 in the X direction on the memory card 20 (i.e., $P_x=E_x$). Accordingly, the number of slitting wheels 36 is driven by $P_x-1$. Thus, in making the card 20 of FIG. 1, as the tape 32 (.160 inch wide) is fed past the slitting station 34 it may be slit into four first strips 38 (.040 inch wide) by three slitting knives 36.

The first strips 38 are then moved past and through a spacer 40, which may comprise any of a number of well-known expedients. FIG. 2 depicts a solid block 42 of a suitable material containing four guide grooves 44 therein. The spacer 40 effects an X spacing $S_x$ (here .120 inch) between adjacent first strips 38 and transverse thereto which is precisely the same as the desired spacing ($S_x$) in the X direction of the segments 24 on the memory card 20. Moreover, the slitting knives 36 may themselves effect separation by appropriate shaping thereof as shown in FIG. 2.

Another supply reel 50 contains a supply of a carrier tape 52, which may comprise any suitable adhesive material, such as a curable plastic. Preferably, the tape 52 conveniently includes a front surface (visible in FIG. 2) which is adhesive-bearing, and a reverse surface which, when subjected to a mild heat treatment, adheres to anything which it contacts. The carrier tape 52 is fed by means (not shown) in a direction generally transverse to the direction of movement of the now spaced first strips 38 so that their paths cross at some selected location.

The selected locations, last described, may be generally defined by a support or table 54. The carrier tape 52 is indexed until it is positioned over the support 54. Movement of the carrier tape 52 then ceases, and the spaced first strips 38 are moved until they overlie the carrier tape 52. Means, which may include a denticular plate 56 rotatably hinged to the support 54, or any other convenient facility presses the spaced first strips 38 against the adhesive-bearing side of the carrier tape 52. The first strips 38 are now securely mounted on the tape 52.

Figures 3, 4:
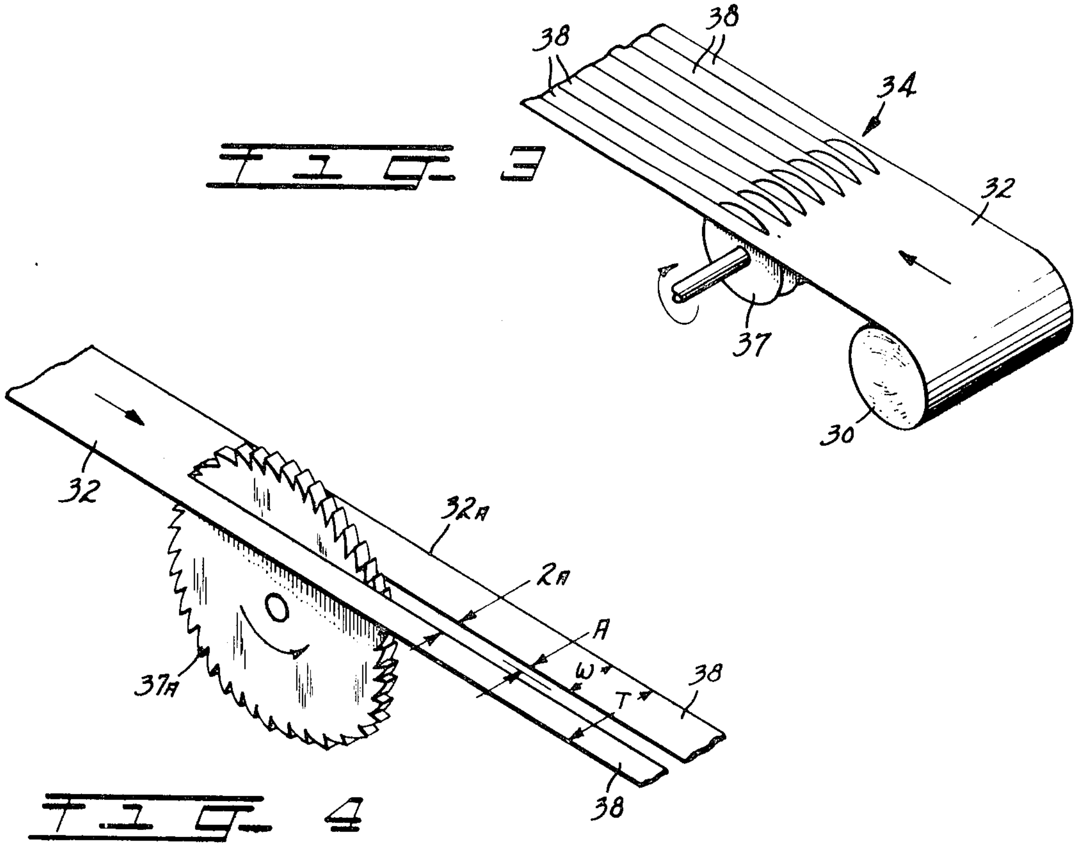
FIG. 3 is an alternative form of the slitting facilities of the apparatus of FIG. 2.
FIG. 4 is a modification of the slitting facilities shown in FIG. 2.

In a second embodiment, as exemplified by FIGS. 3 and 4, the number, $P_x$, of first strips 38 produced at the slitting station 34 is equal to some whole number multiple of the number $E_x$ of elements 24 in the X direction on a single memory card 20. The whole number may, for example, be two in which case the number of first strips 38, as determined by FIG. 1 is eight (e.g., $E_x=4$ and $P_x=2E_x=8$). Again, the number of rotatable slitting knives 37 (FIG. 3) is given by $P_x-1$ where $P_x$ is the total number of first strips produced at the slitting station 34. The tape 32 is fed past the slitting station 34 and it is slit into eight first strips 38 by seven slitting knives 37 (FIG. 3).

In this second embodiment as well as other embodiments where alternate strip placement is utilized, the spacer 40 is eliminated. Accordingly, all of the adjacent first strips 38 are positioned over the tape 52 and the support 54. Alternate first strips (e.g., every other strip, every third strip, etc.) are next mounted on or adhered to the tape 52 by a denticular plate (not shown) similar to the plate 56. Subsequently the plate may be appropriately shifted in the X direction to mount or adhere the remaining strips 38 to a new portion of the tape 52 which has been moved in step-wise fashion; or, a second, a third, etc. denticular plate (not shown) may be used. Exemplary of this embodiment and of the card 20 of FIG. 1, if every other first strip 38 is adhered to the tape 52, the X dimension of each first strip 38 (hereinafter $W_x$) equals the X spacing $S_x$; if every third of the first strips 38 is adhered, $W_x$ of each first strip equals $\frac{1}{2}S_x$ (i.e., the X spacing equals twice the X dimension); etc.

In a first permutation of the second embodiment, the desired $S_x$ spacing between the elements 24 is a whole number multiple of the $W_x$ dimension of such elements and every Nth strip 38 is mounted to the tape 52 where $N-1$ is equal to the whole number multiple. In this event, the character of the slitting and adhering operations is quite easy to define. For example, on the memory card 20, $W_x$ of the elements 24 is .040 inch; $S_x$ is .120 inch (i.e., 3×.040). Accordingly, the tape 32, which is chosen to be .640 inch wide, is slit into sixteen first strips 38 ($P_x=4E_x=16$) by fifteen ($P_x-1=16-1=15$) slitting knives 37 (similar to FIG. 3) so that each fourth strip is separated by three strips (again 3×.040=.120). The first strips 38 remain adjacent and are not transversely separated. Next, every fourth strip 38 is adhered to the carrier tape 52, an X spacing ($S_x$) of .12 (i.e., 3×.040=.120) being inherently effected.

In a second permutation of the second embodiment, either the desired X spacing ($S_x$) between the elements 24 is not a whole number multiple of the X dimension ($W_x$) thereof, or $N-1$ is not equal to the whole number multiple of the number of elements in the X direction on the card; and if the modified arrangement of FIGS. 2 and 3 (e.g., without the spacer 40) is used, the character of the slitting operation is somewhat more complicated. It has been found expedient, in this event, to simultaneously effect material removal and to slit the tape 32, for example with the rotating saw blade 37a of FIG. 4 which has some finite thickness. Further, it is convenient to remove the same amount of material from each edge of every strip 38, except the two outside edges 32a of the tape 32.

It has been found that the relationship $$A=\frac{S_x-(N-1)W_x}{2N}$$

defines the amount A of material to be removed from each side of each first strip 38 except as noted above, the two outside edges 32a, of the tape 32, where:

$S_x$=the X spacing between adjacent first strips 38 on the tape 52;

$W_x$=the X dimension of each first strip 38; and

N is a whole number indicative of whether every other ($N=2$), every third ($N=3$), etc. first strip 38 is adhered to the tape 52. Note that 2A is the thickness of the saw blade 37a of FIG. 4 (the blades 37 of FIG. 3 have zero thickness, that is, they effect no material removal).

The above relationship holds only where $$S_x \geq (N-1)W_x$$

and $$N=1, 2, 3, 4 \ldots n$$

Moreover, the original width T of the tape 52 is given by $$T=P_x(W_x)+(P_x-1)2A \text{ or } P_x(W_x+2A)-2A$$

where, again, $P_x$ is the total number of first strips 38, produced at the slitting station 34.

It should be noted that the above formulae are general and apply to all situations whether there is material removal or not) where it is inexpedient to use the spacer 40. Obviously, where the spacer 40 is used, first strips 38 of any dimension and of any spacing may be obtained.

Three examples of the use of these formulae should suffice.

(I) Assume the card 20 ($E_x=4$) of FIG. 1 is to be made without using the spacer 40, by adhering every other ($N=2$) first strip 38 to the tape 52. Here, while $S_x$ is a whole number multiple of $W_x$, $N-1$ does not equal this whole number. This is, $N-1=2-1=1$; but the whole number equals 3. Thus, the blades 37a of FIG. 4 must be used.

Thus, $$P_x=NE_x=(2)(4)=8$$
$$S_x=.120 \text{ inch}$$
$$N=2$$
$$W_x=.040 \text{ inch}$$

Because $$S_x \geqq (N-1)W_x$$
$$.120 \geqq (2-1).040, \text{ and}$$
$$.120 \geqq .040$$

the relationship $$A=\frac{S_x-(N-1)W_x}{2N} \text{ may be used to yield}$$

$$A=\frac{.120-(2-1).040}{(2)(2)}$$
$$=\frac{.120-.040}{4}$$
$$=\frac{.080}{4}=.020 \text{ inch}$$

Moreover, $$\begin{aligned}T&=P_x(W_x+2A)-2A\\&=(8)(.040+.040)-2(.020)\\&=(8)(.08)-.04\\&=.64-.04\\&=.60 \text{ inch}\end{aligned}$$

Lastly, the number of saw blades 37a is $$P_x-1=8-1=7$$

and each one is to have a thickness of $$2A=2(.020)=.040$$

(II) Assume that the card 20 of FIG. 1 is to be made without the spacer 40, by adhering every third ($N=3$) first strip 38 to the tape 52, but that the spacing, $S_x$ is to be .110 inch instead of .120 inch. Here the spacing $S_x$ is not a whole number multiple of the width $W_x$ of each strip 38 and, again blades 37*a* like those of FIG. 4 must be used.

Thus, $$P_x=NE_x=(3)(4)=12$$
$$S_x=.110\text{ inch}$$
$$N=3$$
$$W_x=.040\text{ inch}$$

Because, $$S_x \geqq (N-1)W_x$$
$$.110 \geqq (3-1).040,\text{ and}$$
$$.110 \geqq .080$$

the relationship $$A=\frac{S_x-(N-1)W_x}{2N}\text{ may be used to yield}$$

$$A=\frac{.110-(3-1).040}{2(3)}$$
$$=\frac{.110-.080}{6}$$
$$=\frac{.03}{6}=.005\text{ inch}$$

Moreover $$T=P_x(W_x+2A)-2A$$
$$=12(.040+.01)-.01$$
$$=12(.05)-.01$$
$$=.59\text{ inch}$$

Lastly, the number of saw blades 37*a* is $$P_x-1=12-1=11$$

and each one is to have a thickness of $$2A=2(.005)=.01\text{ inch}$$

(III) Assume now that the card 20 of FIG. 1 is to be made without the spacer 40, by adhering every fourth ($N=4$) first strip 38 to the tape 52. It was shown earlier that a .640 inch wide tape 32 ($T=.640$) slit by fifteen blades 37 into sixteen first strips 38 of .040 inch width ($W_x=.040$), every fourth of which is adhered to the carrier tape 52, produces the desired result. This example, is, thus, a check on the general formula. Note that here $S_x$ is a whole number (3) multiple of $W_x$ and $N-1$ ($4-1=3$) equals such whole number. Accordingly, the blades 37 of FIG. 3 may be used.

Thus, $$P_x=NE_x=(4)(4)=16$$
$$S_x=120\text{ inch}$$
$$N=4$$
$$W_x=.040\text{ inch}$$

Because, $$S_x \geqq (N-1)W_x$$
$$.120 \geqq (4-1).040,\text{ and}$$
$$.120 \geqq .120$$

the relationship $$A=\frac{S_x-(N-1)W_x}{2N}\text{ may be used to yield}$$

$$A=\frac{.120-(4-1).040}{(2)(4)}=\frac{.120-.120}{8}=0$$

That is no material removal is necessary.

Moreover, $$T=P_x(W_x+2A)-2A$$
$$=16(.040+0)-0$$
$$=16(.040)=.640\text{ inch}$$

Lastly, the number of saw blades 37 is $$P_x-1=16-1=15$$

and each one is to have a thickness of $$2A=2(0)=0$$

These three examples are summarized in the following table.

TABLE I.—ALTERNATE STRIP PLACEMENT—NO SPACER 40 USED

| | Number of elements 24 in X direction ($E_x$) | $W_x$ | $S_x$ | $T$ | $P_x$ | Number of blades ($P_x-1$) | Thickness of blades (2A) | N |
|---|---|---|---|---|---|---|---|---|
| I | 4 | .040 | .120 | .600 | 8 | 7 | .040 | 2 |
| II | 4 | .040 | .110 | .590 | 12 | 11 | .010 | 3 |
| III | 4 | .040 | .120 | .640 | 16 | 15 | .000 | 4 |

After the separated first strips 38 are adhered to the carrier tape 52, severing facilities 58 of any conventional design sever the first strips 38 transversely thereof. If the trips 38 are alternately adhered (i.e., separated) as described above, the severing facilities may comprise a denticular, shiftable blade (not shown), which severs only those strips 38 presently adhered to the tape 52.

Next the first-strip-bearing tape 52 is moved toward a second selected position which is generally defined by a support or table 60. The tape 52 may be moved in stepwise fashion from the support 54 so that, when an unoccupied area of the tape 52 is aligned with newly fed-out (or remaining) first strips 38, one of the above-described cycles is repeated.

In any event, as the strip 52 moves toward the support 60, a second slitting station 64 is reached. Similar to the first slitting station 34 the second station 64 may contain a plurality of slitting blades or saws 66 similar to the blades 36 or to other types of blades or saws (not shown) like those of FIGS. 3 and 4. The number of slitting blades at the slitting station 64 is sufficient to slit the tape 52 into a plurality of second strips 68 which is some whole number multiple of the number $E_y$ of segments 24 in the Y direction on the memory card 20. In FIG. 2 the number of segments 24 in the Y direction is five and the whole number is two (i.e., $P_y=2E_y=2\times5=10$). Accordingly, nine slitting blades ($P_y-1$) 66 slit the tape 52 into ten second strips 68.

The second strips 68 may be formed in any of the ways of forming the first strips 38. The general formulae and considerations are the same in both cases.

The second strips 68 may be fed through spacing means 69 which may be similar to the spacer 40. From the spacing means 69 the second strips 68 reach the support 60. Where alternate second strip placement is desired, the spacer 69 is eliminated.

Onto the support 60 is placed, by conventional feeding apparatus (not shown) a substrate 26 from a stack 26*a* thereof. Means, which may include a denticular plate 72, move against the second strips 68. Such movement places, in the present example, every other second strip 68 on the substrate 26. Because of the previously described second slitting operation any desired Y spacing ($S_y$) may be effected. Simultaneously with the placement of the second strips 68 on the substrate 26, cutting facilities 74 sever the placed strips 68 transversely thereof. The cutting facilities may be shiftable or selectively operable in accordance with the alternate placement of the strips 68.

The last step may be the mild heat treatment of the assembly which includes the substrate on which resides the 4 x 5 matrix 22 of the segments 24. Such mild heat treatment causes the reverse side of the tape 52 to cure thus firmly adhering the segments 24 on the alternate second strips 68 to the substrate.

The alternate second strips 68 which were not previously placed on a substrate 26 still remain. Accordingly, either a second denticular plate similar to the plate 72 is used, or the denticular plate 72 may, shifted as required, move the remaining group of second strips 68 onto a subsequent substrate 26 from a stack 26*b* thereof which has been placed on the table 60. The subsequent treatment of this substrate is similar to that described above. In FIG. 2, the denticular plate 72 contains protrusions 76 containing vacuum passages. After the first group of second strips 68 are severed by the facilities 74, the plate moves to the right, picks up such strips 68 via the vacuum and places them on a substrate from the stack 26*a*, after returning to the left. The remaining second strips 68 are then severed by the facilities 74 and the plate 72 returns to the right and places the remaining strips 68 on a substrate 26 fed from the stack 26*b*.

It should be noted that in the described embodiment the first slitting operation may be followed by the spacing of the first strips 38 and the placement of the strips on the tape 52. This first slitting operation may also be followed by a step of alternate strip placement as described above. Similarly, the operation described above following the second slitting operation may involve either the separation and placement of, or the alternate placement of, the second strips 68. Moreover, any combination or permutation of these operations after either slitting operation may be followed as desired. Moreover, where alternate strip placement is used, any conventional step-wise feeding arrangement, including synchronizing facilities may be used to feed the tapes 32 and 52, the strips 38 and 68, and the substrates 26.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A method of forming an article, the article including a matrix of workpieces on a substrate having planar X and Y dimensions, each workpiece being spaced from adjacent workpieces by selected X and Y spacings, which method comprises the steps of:

(a) forming a plurality of first strips having generally parallel sides;
(b) transversely separating adjacent first strips by the X spacing;
(c) mounting said separated first strips parallel to each other on a carrier tape;
(d) forming a plurality of second strips from said first strip-bearing carrier tape, the angle between the sides of said second strips and the sides of said first strips being the same as the angle between the X and Y dimensions;
(e) transversely separating adjacent second strips by the Y spacing; and
(f) mounting said separated second strips parallel to each other on the substrate, the longitudinal dimension of said second strips being parallel to said X dimension.

2. The method of claim 1 wherein:

step (a) comprises slitting longitudinally a sheet of magnetic material;
step (c) comprises contacting an adhesive-bearing side of said carrier tape with said first strips, said carrier tape being made of a heat-curable material;
step (f) comprises placing said second strips on an electrically conductive, non-magnetic substrate and curing said heat-curable carrier tape; and
in step (d) said angle is a right angle.

3. The method set forth in claim 1 wherein:

step (a) includes forming said first strips to have a transverse dimension equal to the X spacing; and
steps (b) and (c) are simultaneously effected by mounting, as a group, every other first strip to said carrier tape.

4. The method set forth in claim 1 wherein:

step (d) includes forming said second strips with a transverse dimension equal to the Y spacing; and
steps (e) and (f) are simultaneously effected by mounting, as a group, every other second strip to the substrate.

5. The method of claim 3 wherein:

step (d) includes forming said second strips with a transverse dimension equal to the Y spacing; and
steps (e) and (f) are simultaneously effected by mounting, as a group, every other second strip to the substrate.

6. The method of claim 5 wherein the angle set forth in step (d) is a right angle.

7. The method of claim 1 wherein:

step (a) includes forming said first strips so that the X spacing is equal to a whole number multiple of the transverse dimension; and
steps (b) and (c) are simultaneously effected by mounting, as a group, every Nth first strip on said carrier tape, where N is a whole number greater than zero and is selected so that adjacently mounted first strips of said group are separated by the X spacing.

8. The method of claim 7 wherein, following said mounting of every Nth first strip, steps (b) and (c) are again simultaneously effected by mounting, as a group, every $(N-n)$th first strip on said carrier tape, $n$ being increased by 1 after the mounting of each group of said first strips until $(N-n)$ is zero.

9. The method of claim 1 wherein:

step (d) includes forming said second strips so that the Y spacing is equal to a whole number multiple of the transverse dimension; and
steps (e) and (f) are simultaneously effected by mounting, as a group, every Nth second strip on the substrate, where N is a whole number greater than zero and is selected so that adjacently mounted second strips of said group are separated by the Y spacing.

10. The method of claim 9 wherein, following said mounting of every Nth second strip steps (e) and (f) are again simultaneously effected by mounting, as a group, every $(N-n)$th second strip on said substrate, $n$ being increasel by 1 after the mounting of each group of said second strips until $(N-n)$ is zero.

11. The method of claim 7 wherein:

step (d) includes forming said second strips so that the Y spacing is equal to a whole number multiple of the transverse dimension; and
steps (e) and (f) are simultaneously effected by mounting, as a group, every Nth second strip on the substrate, where N is a whole number greater than zero and is selected so that adjacently mounted second strips of said group are separated by the Y spacing.

12. The method of claim 11 wherein the angle set forth in step (d) is a right angle.

13. The method of claim 8 wherein:

step (d) includes forming said second strips so that the Y spacing is equal to a whole number multiple of the transverse dimension; and
steps (e) and (f) are simultaneously effected by mounting, as a group, every Nth second strip on the substrate, where N is a whole number greater than zero and is selected so that adjacently mounted second strips of said group are separated by the Y spacing.

14. The method of claim 13 wherein the angle set forth in step (d) is a right angle.

15. The method of claim 7 wherein:

following said mounting of every Nth second strio steps (e) and (f) are again simultaneously effected by mounting, as a group, every $(N-n)$th second strip on said substrate, $n$ being increased by 1 after the mounting of each group of said second strips until $(N-n)$ is zero.

16. The method of claim 15 wherein the angle set forth in step (d) is a right angle.

17. The method of claim 8 wherein:

following said mounting of every Nth second strip steps (e) and (f) are again simultaneously effected by mounting, as a group, every $(N-n)$th second strip on said substrate, $n$ being increased by 1 after the mounting of each group of said second strips until $(N-n)$ is zero.

18. The method of claim 17 wherein the angle set forth in step (d) is a right angle.

19. In a method of forming an article, the article including a matrix of workpieces on a substrate having planar X and Y dimensions, the matrix including a first quantity of workpieces along the X dimension and a second quantity of workpieces along the Y dimension, each workpiece being spaced from adjacent workpieces by selected X and Y spacings, $S_x$ and $S_y$, respectively, and each workpiece having selected X and Y dimensions, $W_x$ and $W_y$, respectively, which method comprises the steps of:

(a) slitting longitudinally a sheet having a transverse dimension $T_x$ to form a plurality of first strips, the number of which is a first whole number multiple of the first quantity, all but the outermost two first strips having edges adjacent said slits;

(b) removing from said slit-adjacent first strip edges an amount of material $A_x$;

(c) mounting every $N_x$th first strip to a carrier tape having a dimension $T_y$ parallel to said mounted first strips, said amount $A_x$ being defined by $$A_x=\frac{S_x-(N_x-1)W_x}{2N_x}$$

where $$S_x \geq (N_x-1)W_x$$

$$T_x=P_x(W_x+2A_x)-2A_x$$

and said first whole number $$=N_y-1$$

(d) slitting said carrier tape transverse to said mounted first strips to form a plurality of second strips, the number of which is a second whole number multiple of the second quantity, all but the outermost two second strips having edges adjacent said slits;

(e) removing from said slit-adjacent second strip edges an amount of material $A_y$; and (f) mounting every $N_y$th second strip to the substrate, said amount $A_y$ being defined by $$A_y=\frac{S_y-(N_y-1)W_y}{2N_y}$$

where $$S_y \geq (N_y-1)W_y$$

$$T_y=P_y(W_y+2A_y)-2A_y$$

and said second whole number $$=N_y-1$$

References Cited

UNITED STATES PATENTS

| | | | |
|---|---|---|---|
| 1,588,797 | 6/1926 | Mell ............ | 156—264 X |
| 3,392,053 | 7/1968 | Olson et al. ...... | 29—604 UX |

JOHN F. CAMPBELL, Primary Examiner

C. E. HALL, Assistant Examiner

U.S. Cl. X.R.

156—259, 265; 340—174 TF, 174 M, 174 VA

L-566-PT
(8-69)

UNITED STATES PATENT OFFICE
CERTIFICATE OF CORRECTION

Patent No. 3,609,858 Dated October 5, 1971

Inventor(s) EVERETT J. SHAW and DANIEL G. STETKA

It is certified that error appears in the above-identified patent and that said Letters Patent are hereby corrected as shown below:

Column 4, line 46, "alternative" should read --alternatives--; line 51, "driven" should read --given--. Column 5, line 56, ".12" should read --.120--. Column 6, line 24, "situations whether" should read --situations (whether--. Column 7, line 48, "$S_x$ = 120 inch" should read --$S_x$ = .120 inch--. Column 8, line 14, "trips" should read --strips--. Column 10, line 34, claim 10, "increasel" should read --increased--. Column 11, line 30, claim 19, "$=N_y - 1$" should read --$=N_x - 1$--.

Signed and sealed this 21st day of March 1972.

(SEAL)
Attest:

EDWARD M.FLETCHER,JR.
Attesting Officer

ROBERT GOTTSCHALK
Commissioner of Patents